DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 2, 1974

921 O.G. 9

T921,001
MANUFACTURE OF POTABLE WATER FROM SEA WATER

Richard G. Devaney, 238 Hammond Ave., Kingsport, Tenn. 37660

Filed Oct. 19, 1972, Ser. No. 298,915
Int. Cl. B01d *31/00, 13/00*
U.S. Cl. 210—23
1 Sheet Drawing. 5 Pages Specification

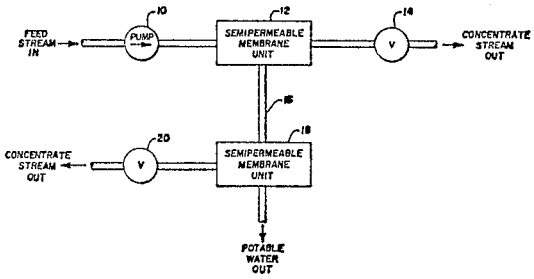

Potable water is manufactured from sea water by passing it serially through two reverse osmosis units. The product of the first unit is of sufficient purity and under sufficient pressure as the result of the first unit pressurization to enable the second unit to be operated without repressurization.

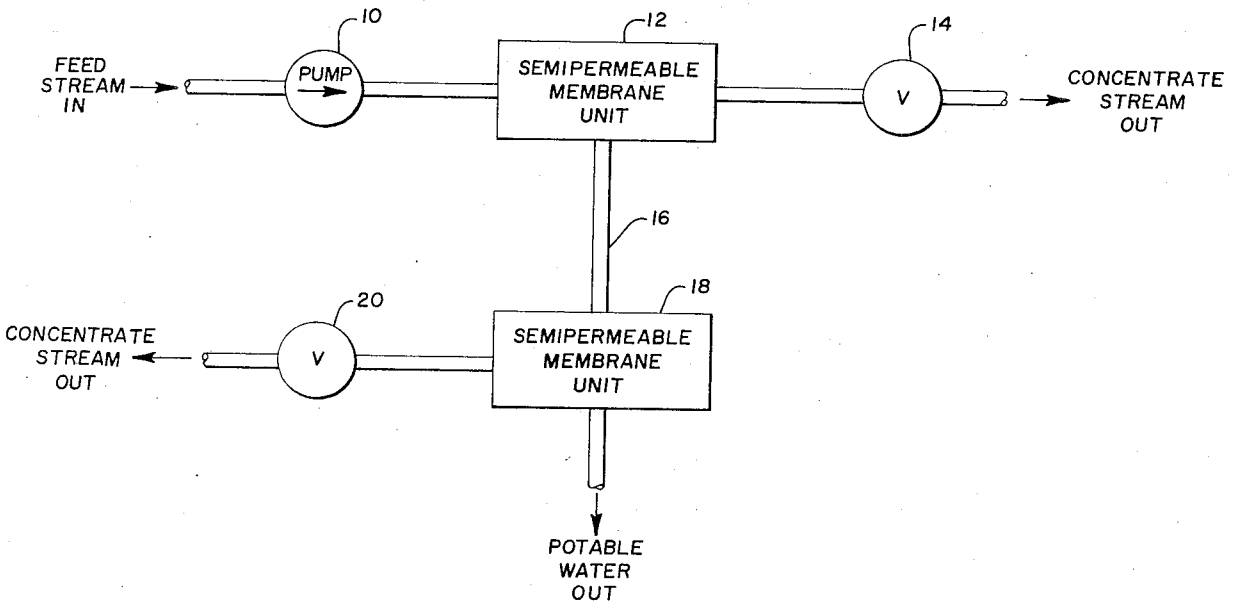

April 2, 1974 R. G. DEVANEY T921,001
MANUFACTURE OF POTABLE WATER FROM SEA WATER
Filed Oct. 19, 1972